(12) United States Patent
Yoneda et al.

(10) Patent No.: US 12,499,988 B2
(45) Date of Patent: Dec. 16, 2025

(54) ULTRASONIC PROBE, ULTRASONIC DIAGNOSTIC SYSTEM, ULTRASONIC DIAGNOSTIC PROGRAM, AND METHOD OF ULTRASONIC DIAGNOSTIC

(71) Applicant: Socionext Inc., Kanagawa (JP)

(72) Inventors: Naoto Yoneda, Yokohama (JP); Masaya Tamamura, Yokohoma (JP); Naoto Adachi, Yokohama (JP); Hiroshi Kishi, Yokohama (JP)

(73) Assignee: ABLIC INC., Nagano (JP)

( * ) Notice: Subject to any disclaimer, the term of this patent is extended or adjusted under 35 U.S.C. 154(b) by 61 days.

(21) Appl. No.: 17/726,201

(22) Filed: Apr. 21, 2022

(65) Prior Publication Data
US 2022/0246283 A1  Aug. 4, 2022

Related U.S. Application Data

(63) Continuation of application No. PCT/JP2019/043501, filed on Nov. 6, 2019.

(51) Int. Cl.
*G16H 30/20* (2018.01)
*A61B 8/00* (2006.01)
*H04W 4/38* (2018.01)

(52) U.S. Cl.
CPC ............. *G16H 30/20* (2018.01); *A61B 8/461* (2013.01); *A61B 8/565* (2013.01); *H04W 4/38* (2018.02)

(58) Field of Classification Search
CPC .................................................... G16H 30/20
See application file for complete search history.

(56) References Cited

U.S. PATENT DOCUMENTS

| 10,736,602 B2 | 8/2020 | Gubbini et al. |
| 2010/0298713 A1 | 11/2010 | Robinson |
| 2011/0051727 A1* | 3/2011 | Cai ........................ H04L 45/24 370/390 |
| 2012/0215092 A1 | 8/2012 | Harris, III et al. |
| 2015/0207578 A1* | 7/2015 | Ramamurthy .... H04W 72/0453 370/338 |

(Continued)

FOREIGN PATENT DOCUMENTS

| JP | 2002-016959 A | 1/2002 |
| JP | 2008-018107 A | 1/2008 |

(Continued)

OTHER PUBLICATIONS

International Search Report (ISR) dated Jan. 7, 2020 issued in International Patent Application No. PCT/JP2019/043501, with English translation.

(Continued)

*Primary Examiner* — Nicholas P Celani
(74) *Attorney, Agent, or Firm* — Rimon P.C.

(57) ABSTRACT

An ultrasonic probe includes a probe configured to receive an ultrasonic wave, a plurality of wireless communication devices, and processing circuitry configured to assign identification information to ultrasonic image data generated based on the ultrasonic wave, for identifying the ultrasonic image data; and cause each of the plurality of wireless communication devices to transmit in parallel the ultrasonic image data having the identification information assigned, to a terminal device.

7 Claims, 14 Drawing Sheets

(56) References Cited

U.S. PATENT DOCUMENTS

| | | | | |
|---|---|---|---|---|
| 2016/0105530 A1* | 4/2016 | Shribman | ............ | H04L 67/567 |
| | | | | 709/218 |
| 2017/0105706 A1* | 4/2017 | Berger | ................... | A61B 34/35 |
| 2018/0116636 A1* | 5/2018 | Yoneda | ................. | A61B 8/462 |
| 2018/0263600 A1* | 9/2018 | Bell | ..................... | A61B 8/4472 |
| 2019/0191963 A1* | 6/2019 | Kuhn | ................ | A61B 1/00009 |

FOREIGN PATENT DOCUMENTS

| | | |
|---|---|---|
| JP | 2012-522570 A | 9/2012 |
| JP | 2013-511188 A | 3/2013 |
| JP | 2017-099785 A | 6/2017 |
| WO | 2009/057062 A1 | 5/2009 |
| WO | 2019/208767 A1 | 4/2019 |

OTHER PUBLICATIONS

Written Opinion of the International Searching Authority dated Jan. 7, 2020 issued in International Patent Application No. PCT/JP2019/043501, with English translation of the relevant part.

Oda, Naoyuki, "Radio interference in hospital information systems and countermeasures", (Radio disturbance and its countermeasures in hospital information systems, Monthly New Medical), M.E. Shinko Kyokai KK, vol. 40, No. 11, Nov. 1, 2013, pp. 72-76, with English translation of the relevant part; Cited in the ISR for PCT/JP2019/043501.

Chinese Office Action dated Apr. 27, 2025 issued in the corresponding Chinese Patent Application No. 201980101593.1, with English translation.

* cited by examiner

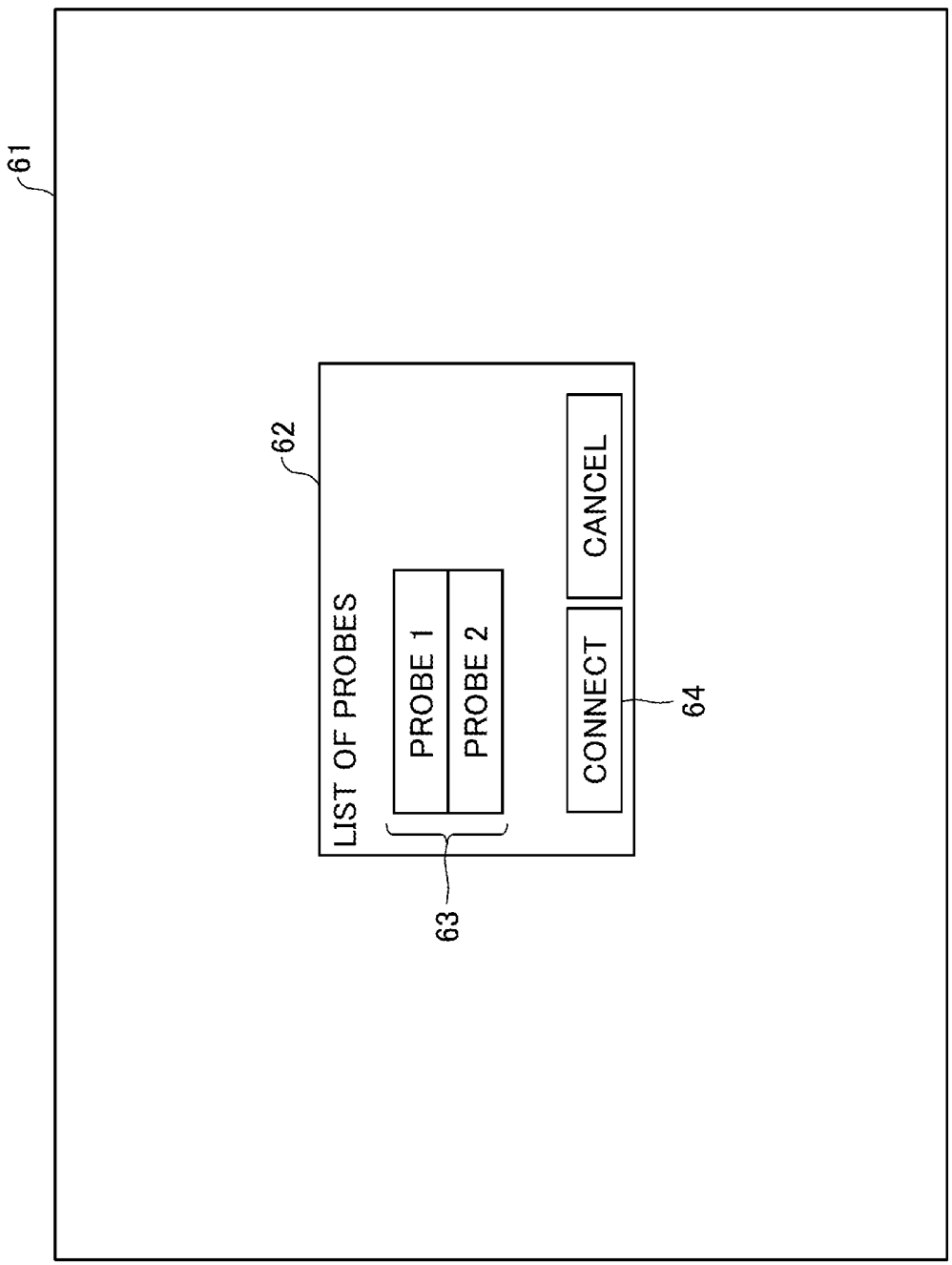

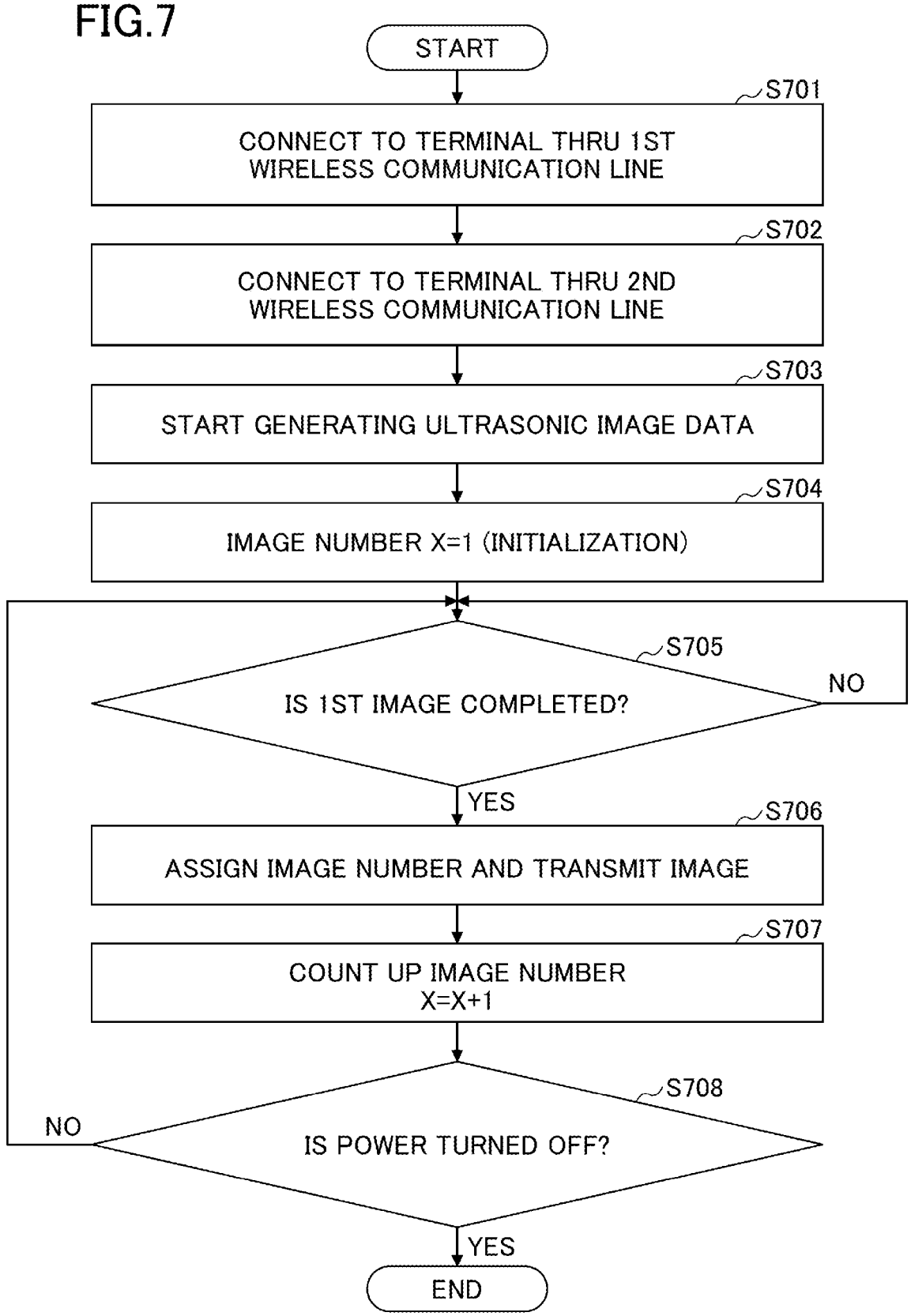

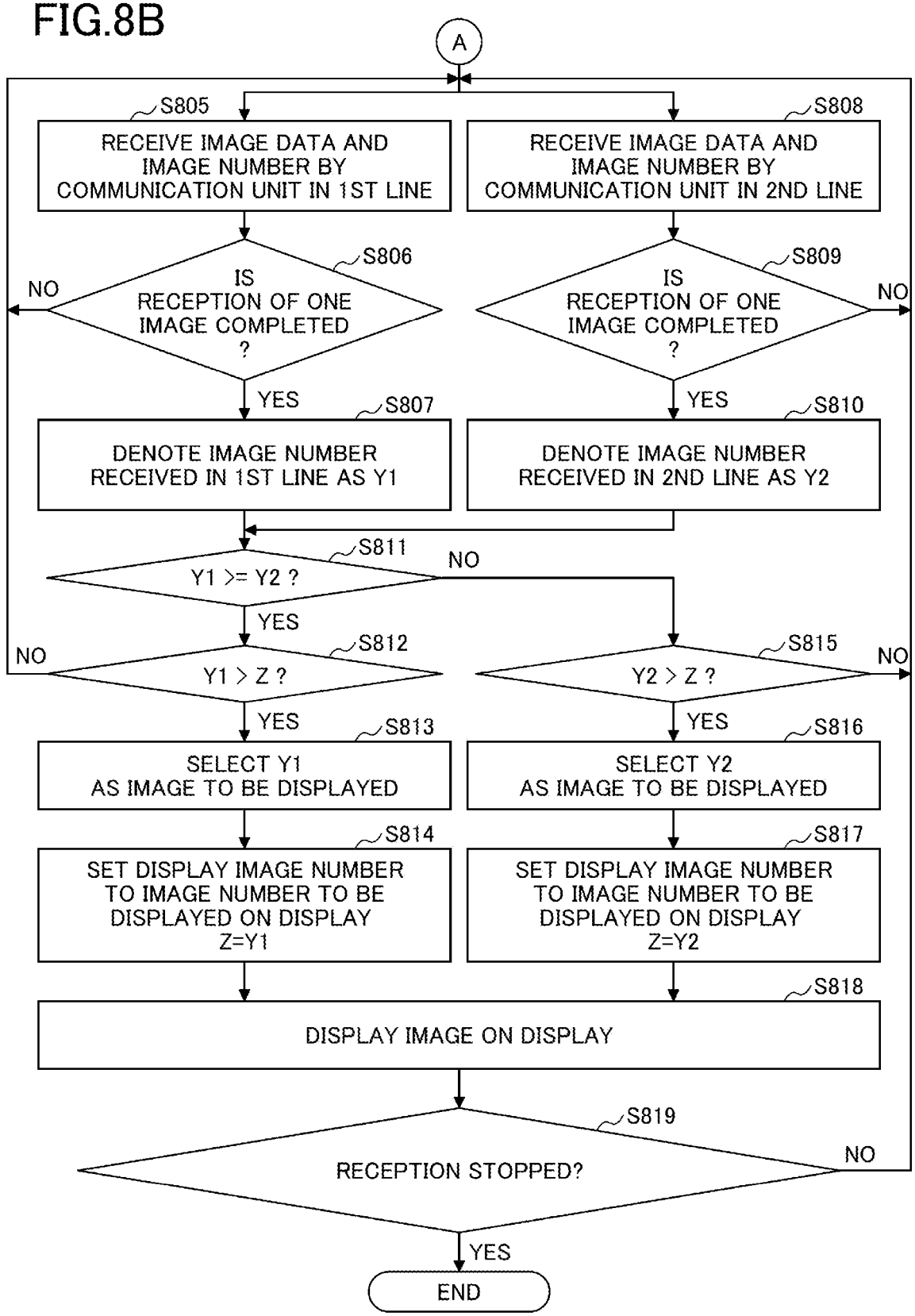

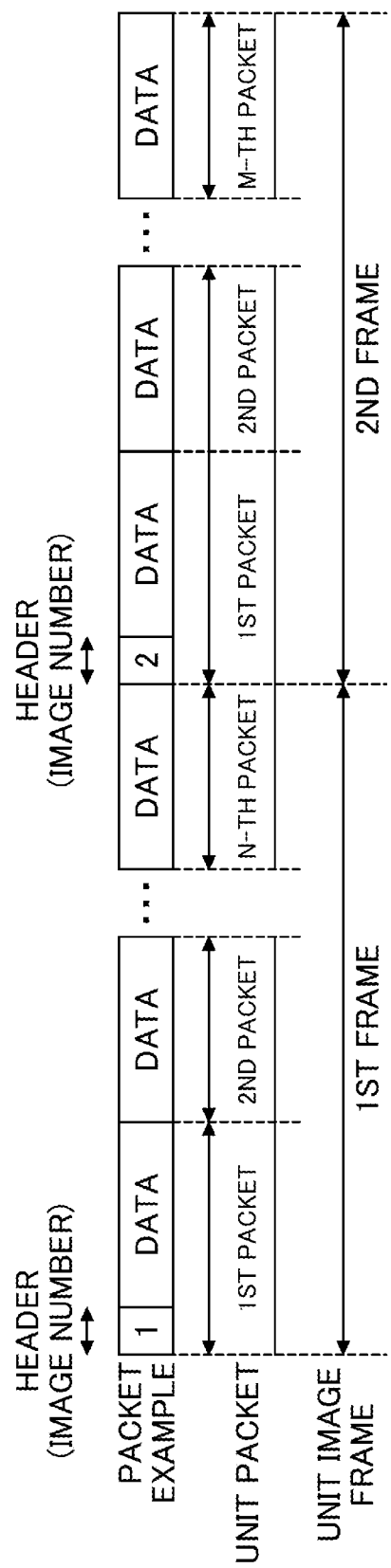

ULTRASONIC PROBE, ULTRASONIC DIAGNOSTIC SYSTEM, ULTRASONIC DIAGNOSTIC PROGRAM, AND METHOD OF ULTRASONIC DIAGNOSTIC

CROSS-REFERENCE TO RELATED APPLICATIONS

This U.S. non-provisional application is a continuation application of and claims the benefit of priority under 35 U.S.C. § 365(c) from PCT International Application PCT/JP2019/043501 filed on Nov. 6, 2019, designated the U.S., the entire contents of which are incorporated herein by reference.

TECHNICAL FIELD

The present disclosure relates to an ultrasonic probe, an ultrasonic diagnostic system, an ultrasonic diagnostic program, and a method of ultrasonic diagnosis.

BACKGROUND ART

In recent years, ultrasonic probes are advancing to become smaller and wireless, and forms are becoming widespread in which signal processing is executed in an ultrasonic probe to generate an image, and ultrasonic image data is wirelessly transmitted to a terminal device such as a tablet.

See, for example, the following patent documents:
[Patent Document 1] Published Japanese Translation of PCT International Application 2012-522570
[Patent Document 2] Japanese Laid-Open Patent Application No. 2017-99785

Although conventional ultrasonic probes described above are easy to handle because no cables are required, unlike wired communication, there is a likelihood that communication is interrupted.

SUMMARY

According to an embodiment in the present disclosure, an ultrasonic probe includes a probe configured to receive an ultrasonic wave, a plurality of wireless communication devices, and processing circuitry configured to assign identification information to ultrasonic image data generated based on the ultrasonic wave, for identifying the ultrasonic image data; and cause each of the plurality of wireless communication devices to transmit in parallel the ultrasonic image data having the identification information assigned, to a terminal device.

BRIEF DESCRIPTION OF DRAWINGS

FIG. 6 is a diagram illustrating an example of a display of the terminal device of the first embodiment;

FIG. 7 is a second flowchart illustrating operations of the ultrasonic probe;

FIG. 8B is a third flowchart illustrating operations of the terminal device;

FIG. 9 illustrates an example of packets used when transmitting ultrasonic image data;

EMBODIMENTS OF THE INVENTION

According to an embodiment in the present disclosure, communication between an ultrasonic probe and a terminal device can be executed satisfactorily.

First Embodiment

Figure 1:
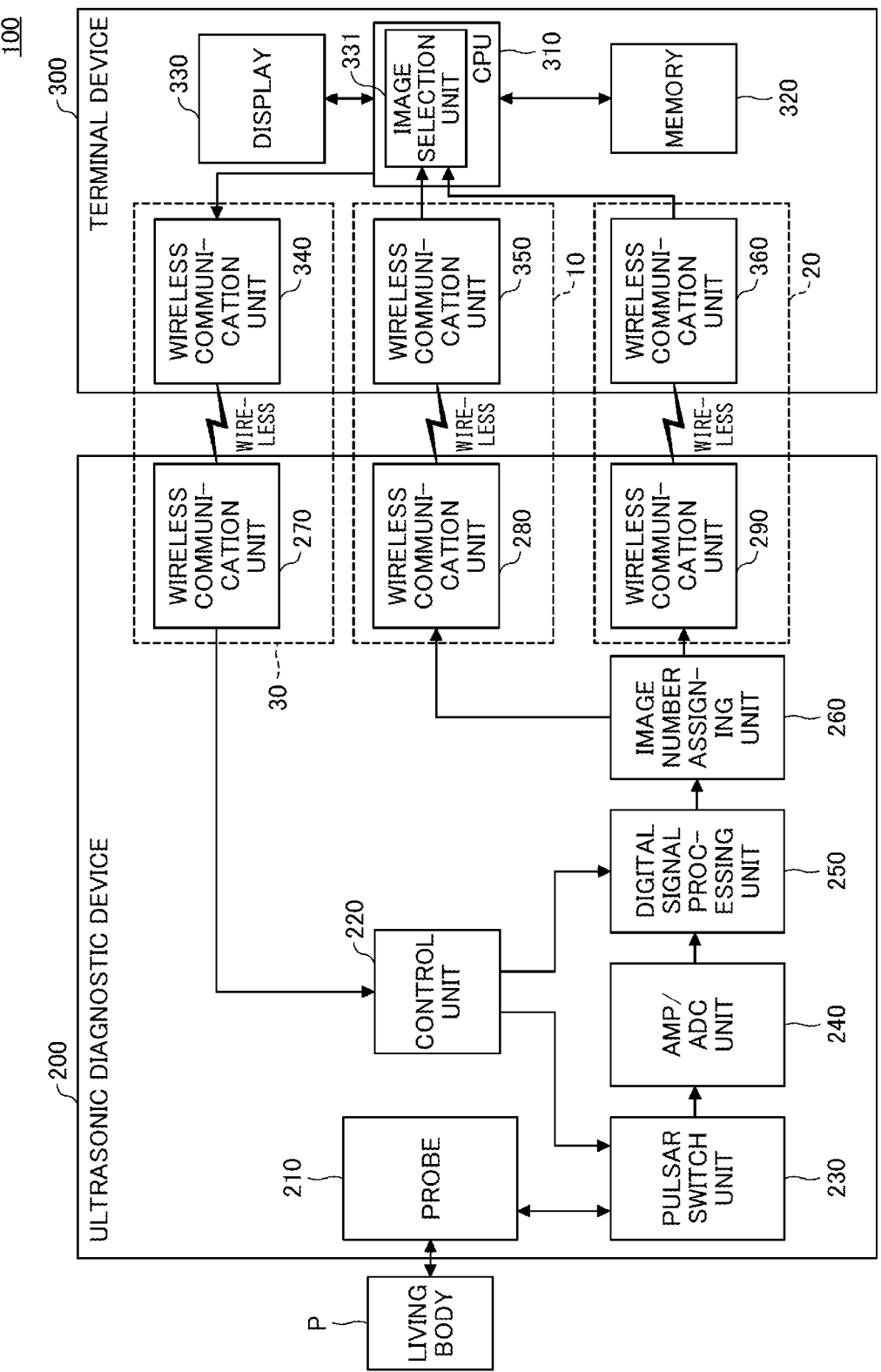
FIG. 1 is a diagram illustrating an example of a system configuration of an ultrasonic diagnostic system of a first embodiment.

In the following, a first embodiment will be described with reference to the drawings. FIG. 1 is a diagram illustrating a system configuration of an ultrasonic diagnostic system of the first embodiment.

In the present embodiment, an ultrasonic diagnostic system 100 includes an ultrasonic probe (ultrasonic diagnostic device) 200 and a terminal device 300. The ultrasonic probe 200 and the terminal device 300 communicate wirelessly.

First, the ultrasonic probe 200 of the present embodiment will be described. The ultrasonic probe 200 of the present embodiment includes a probe 210, a control unit 220, a pulsar switch unit 230, an AMP/ADC (amplifier/analog to digital converter) unit 240, a digital signal processing unit 250, an image number assigning unit 260, a wireless communication unit 270, a wireless communication unit 280, and a wireless communication unit 290.

The probe 210 transmits (emits) an ultrasonic wave to a living body (subject) P and receives the reflected wave.

The control unit 220 (an example of processing circuitry) controls the entire ultrasonic probe 200.

The pulsar switch unit 230 selects the probe 210 by a switch part, and transmits a pulse signal to the probe 210, to cause the probe 210 to emit an ultrasonic wave to the living body P.

When irradiated with the ultrasonic wave, the living body P reflects the ultrasonic wave at a boundary where the acoustic impedance differs. The reflected wave reflected from the living body P is received by the probe 210, and is output to the AMP/ADC unit 240 selected by the switch part of the pulsar switch unit 230.

The AMP/ADC unit 240 amplifies the reflected wave of the ultrasonic wave output from the pulsar switch unit 230 by an amplifier (AMP), converts the amplified wave into a digital signal by an analog to digital converter (ADC), and outputs the signal to the digital signal processing unit 250.

The digital signal processing unit 250 executes various processing on the digital signal output from the AMP/ADC unit 240 to obtain ultrasonic image data, and output the data to the image number assigning unit 260.

Specifically, the processing executed by the digital signal processing unit 250 includes a process of aligning the delay from a timing when the reflected wave was output from the pulsar switch unit 230; a process of averaging (in-phase addition); a process of gain correction that takes into account the attenuation in the living body P; and an envelope process for obtaining the brightness information.

The image number assigning unit 260 assigns an image number to ultrasonic image data output from the digital signal processing unit 250. Therefore, the image number assigning unit 260 is an example of processing circuitry configured to assign identification information of the ultrasonic image data to the ultrasonic image data.

The image number of the present embodiment is identification information for identifying a corresponding ultrasonic image data item, and ultrasonic image data items may be assigned, for example, serial numbers indicating the order in which the ultrasonic image data items are generated. In the present embodiment, in this way, by assigning serial numbers as the image numbers, whether there is lack of an ultrasonic image data item not received by the terminal device 300 can be determined.

Then, the image number assigning unit 260 outputs ultrasonic image data having the image number assigned, to each of the wireless communication unit 280 and the wireless communication unit 290.

The wireless communication unit 270, 280, and 290 (examples of wireless communication devices) execute communication with the terminal device 300. Specifically, the wireless communication unit 270 receives a control signal indicating an operation of the ultrasonic probe 200 from the terminal device 300, through wireless communication according to the standards such as Bluetooth (registered trademark). The received control signal is output to the control unit 220.

The wireless communication unit 280 and the wireless communication unit 290 execute wireless communication, for example, with the terminal device 300 according to the standards such as Wi-Fi (registered trademark of a wireless LAN (Local Area Network) technique). Also, each of the wireless communication unit 280 and the wireless communication unit 290 transmits ultrasonic image data having the image number assigned by the image number assigning unit 260, to the terminal device 300.

In the present embodiment, it is assumed that the wireless communication unit 280 uses the 2.4 GHz band of Wi-Fi, and the wireless communication unit 290 uses the 5.0 GHz band of Wi-Fi. Note that the standards used for the wireless communication are not limited to Wi-Fi, and the other standards may be used.

Note that the ultrasonic probe 200 may include a battery (not illustrated), to supply electric power to the components from this battery. Alternatively, the ultrasonic probe 200 may operate using an external power supply, and in this case, does not need to have a battery.

Next, the terminal device 300 of the present embodiment will be described.

The terminal device 300 of the present embodiment includes a central processing unit (CPU) 310, a memory 320, a display 330, a wireless communication unit 340, a wireless communication unit 350, and a wireless communication unit 360.

The CPU 310 (an example of a processor) controls the overall operations of the terminal device 300. The memory 320 stores ultrasonic image data received from the ultrasonic probe 200 and data obtained as a result of calculation by the CPU 310.

The CPU 310 of the present embodiment also includes an image selection unit 331. The image selection unit 331 selects ultrasonic image data to be displayed on the display 330 from among ultrasonic image data received by the wireless communication unit 350 and ultrasonic image data received by the wireless communication unit 360. Functions of the image selection unit 331 are implemented by a control program executed by the CPU 310 of the terminal device 300. In the following description, the control program that implements the functions of the image selection unit 331 may be referred to as an application.

The display 330 displays ultrasonic image data received from the ultrasonic probe 200.

The wireless communication unit 340 (an example of a wireless communication device) transmits a control signal to control an operation of the ultrasonic probe 200 to the ultrasonic probe 200, for example, through wireless communication according to the standards such as Bluetooth (registered trademark).

The wireless communication unit 350 and the wireless communication unit 360 (examples of wireless communication devices) execute wireless communication, for example, according to the standards such as Wi-Fi. Specifically, in the present embodiment, it is assumed that the wireless communication unit 350 uses the 2.4 GHz band of Wi-Fi to receive image data having the image number assigned, and transmitted from the wireless communication unit 280. Also, in the present embodiment, it is assumed that the wireless communication unit 360 uses the 5.0 GHz band of Wi-Fi to receive image data having the image number assigned, and transmitted from the wireless communication unit 290.

In the following description of the present embodiment, a pair of a wireless communication unit that transmits data and a wireless communication unit that receives the transmitted data may be referred to as a communication line.

Specifically, there may be cases where the wireless communication unit 280 and the wireless communication unit 350 that execute transmission and reception of ultrasonic image data using the 2.4 GHz band of Wi-Fi, are collectively referred to as a first communication line 10; and communication between the wireless communication unit 280 and the wireless communication unit 350 is referred to as communication through the first communication line 10.

Also, in the following description of the present embodiment, there may be cases where the wireless communication unit 290 and the wireless communication unit 360 that execute transmission and reception of ultrasonic image data using the 5.0 GHz band of Wi-Fi, are collectively referred to as a second communication line 20; and communication between the wireless communication unit 290 and the wireless communication unit 360 is referred to as communication through the second communication line 20.

Also, in the present embodiment, there may be cases where the wireless communication unit 270 and the wireless communication unit 340 that execute transmission and reception of control signals of the control signal are collectively referred to as a control communication line 30.

Note that the band used in the first communication line 10 and the band used in the second communication line 20 are not limited to the bands described above. For example, both of the first communication line 10 and the second communication line 20 may use the 2.4 GHz band, and both may use the 5.0 GHz band.

Also, in the present embodiment, in the case of using the same bandwidth, the first communication line 10 and the second communication line 20 may use different channels.

In this way, in the present embodiment, by having the ultrasonic probe 200 transmit the same image data to the terminal device 300 through multiple wireless communication lines, communication between the ultrasonic probe 200 and the terminal device 300 is executed satisfactorily. The ultrasonic probe 200 transmits in parallel the same image data to the terminal device 300 through the multiple wireless communication lines. Also, the ultrasonic probe 200 transmits at the same time the same image data to the terminal device 300 through the multiple wireless communication lines.

Also, in the ultrasonic diagnostic system 100 of the present embodiment, the ultrasonic probe 200 transmits ultrasonic image data to the terminal device 300 by wireless communication. Therefore, according to the present embodiment, when scanning the living body P by the ultrasonic probe 200, the motion of the operator of the ultrasonic probe 200 is not hindered by a communication cable or the like.

Note that the terminal device 300 of the present embodiment may be, for example, a tablet-type terminal device, and in that case, the display 330 may include a touch panel or the like.

Also, in the present embodiment, although the frequency band used in the first communication line 10 is different from the frequency band used in the second communication line 20, it is not limited as such. For example, both of the first communication line 10 and the second communication line 20 may use the 2.4 GHz band, and both may use the 5.0 GHz band.

Also, in the present embodiment, although the ultrasonic diagnostic system 100 includes the two communication lines, it is not limited as such. The ultrasonic diagnostic system 100 simply needs to have two communication lines or more. Specifically, each of the ultrasonic probe 200 and the terminal device 300 simply needs to have two wireless communication units or more.

As the number of communication lines included in the ultrasonic diagnostic system 100 becomes greater, the communication becomes less likely to be interrupted.

Figure 2:
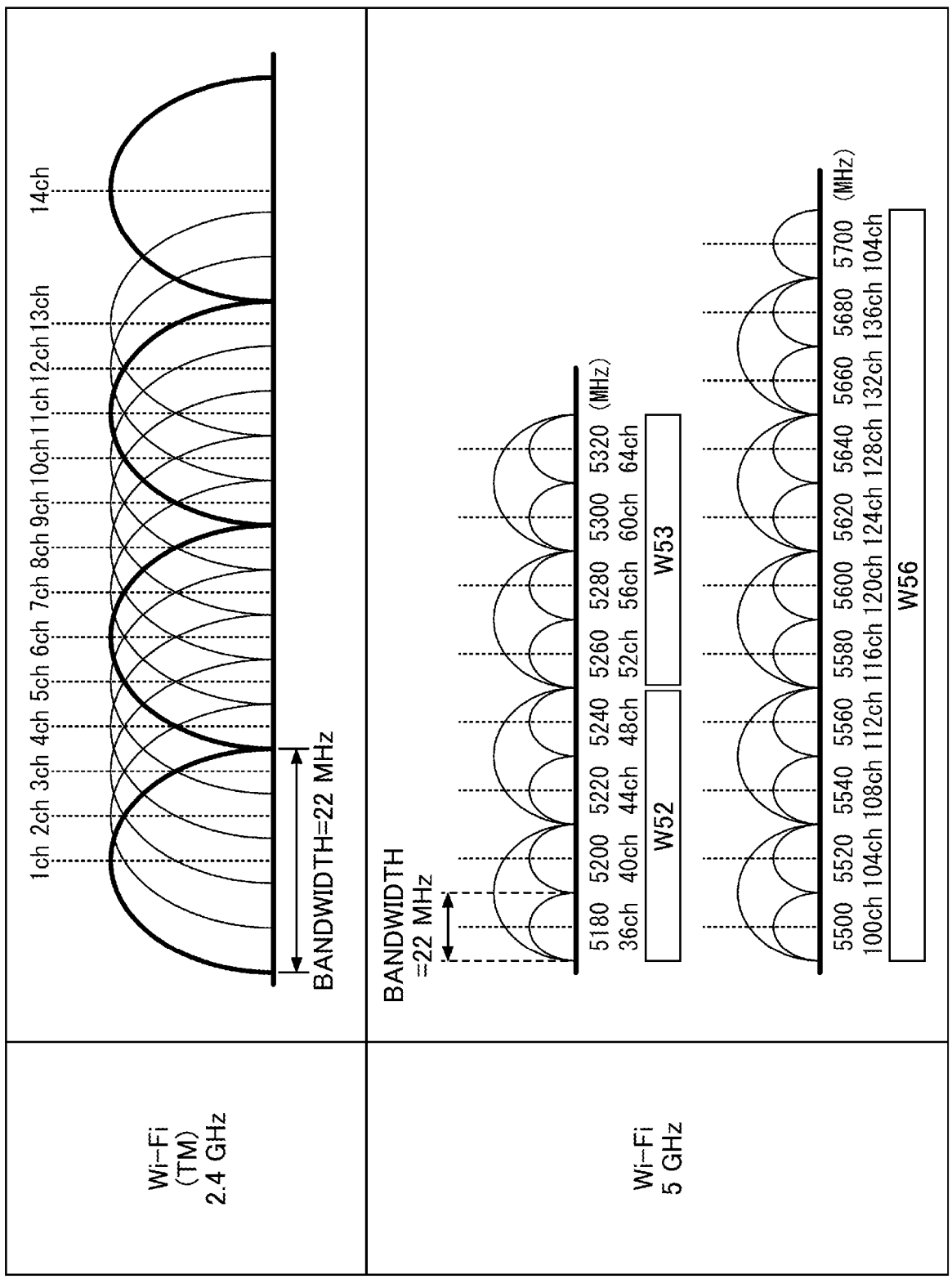
FIG. 2 illustrates an example of channel allocation for the 2.4 GHz band and the 5.0 GHz band of Wi-Fi.

Next, with reference to FIG. 2, allocation of channels in the 2.4 GHz band and the 5.0 GHz band of Wi-Fi will be described. FIG. 2 illustrates an example of channel allocation for the 2.4 GHz band and the 5.0 GHz band of Wi-Fi.

In the 2.4 GHz band of Wi-Fi, 14 channels (1ch-14ch) each having a bandwidth of 22 MHz allocated, 5 MHz apart from each other except for 14ch. The band of each channel overlaps the bands of the neighboring channels.

Note that in the following description, overlap of a channel with the other channels is defined as the bandwidth (22 MHz) of the channel including the centers of the bands of the other channels. For example, 1ch has its band overlapped with 2ch and 3ch, and 2ch has its band overlapped with 1ch, 3ch, and 4ch; 3ch has its band overlapped with 1ch, 2ch, 4ch, and 5ch; and 13ch has its band overlapped with 11ch and 12ch.

Also, there are very many devices that uses the 2.4 GHz band, and hence, there are almost no empty channels.

Also, in the 5.0 GHz band of Wi-Fi, 19 channels each having a bandwidth of 20 MHz are assigned, 20 MHz apart from the neighboring channels in the 5.2 GHz band (W52), the 5.3 GHz band (W53), and the 5.6 MHz band (W56). Therefore, in the 5.0 GHz band, the bands of the channels do not overlap, and hence, interference is not generated between the channels.

However, in the case of using the 5.3 GHz band (W53) or the 5.6 MHz band (W56), a dynamic frequency selection (DFS) function is required.

The DFS function is a function that detects interference with a device that exists in the surroundings such as a radar, and changes the channel used when detecting the interference with another channel. Also, in the channel after the change, in the case where no interference is detected with a radar or the like for 60 seconds, data communication is restarted.

In this way, in communication using Wi-Fi, interruption of data communication is not only caused by the band congestion, but also may be caused by the DFS function.

In the present embodiment, in the situation described above, the ultrasonic probe 200 and the terminal device 300 execute transmission and reception of the same data through multiple communication lines, to suppress interruptions of the data communication.

Figure 3:
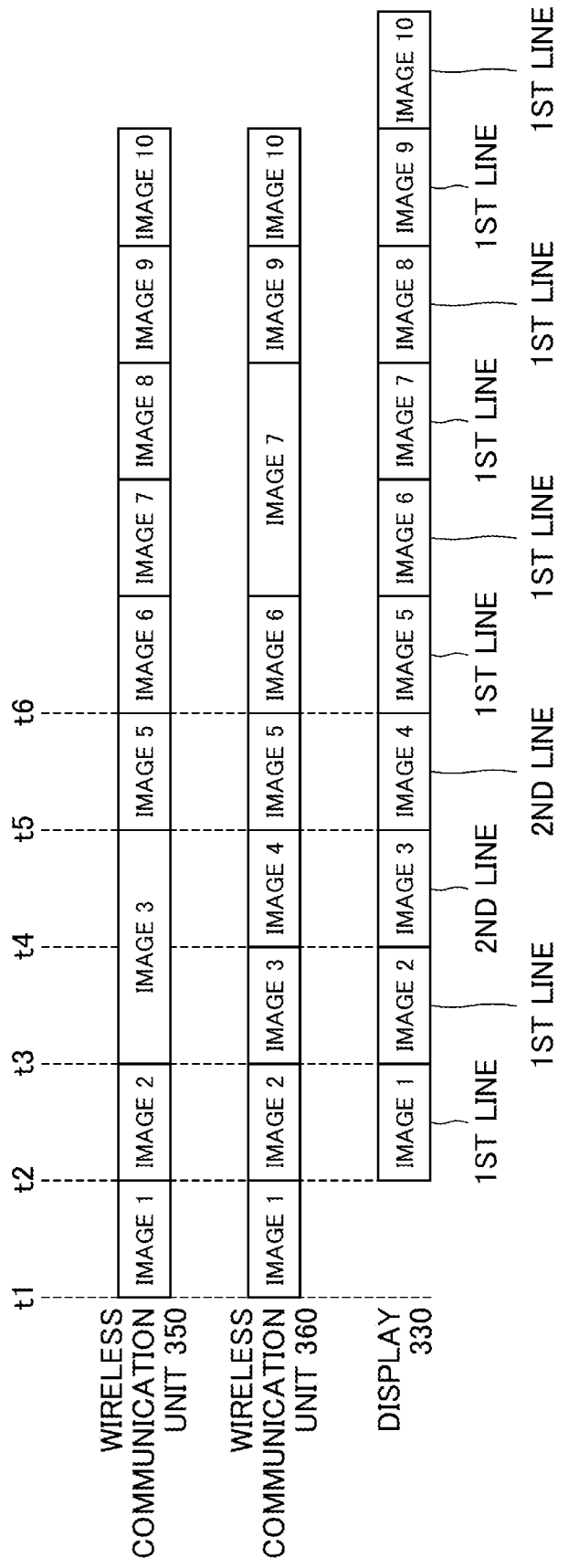
FIG. 3 is a diagram illustrating timings of transmission and reception of ultrasonic image data.

In the following, with reference to FIG. 3, timings of transmission and reception of the ultrasonic image data of the ultrasonic probe 200 and the terminal device 300 of the present embodiment will be described. FIG. 3 is a diagram illustrating timings of the transmission and reception of the ultrasonic image data.

The example in FIG. 3 illustrates timings at which ultrasonic image data from the ultrasonic probe 200 is received by the wireless communication unit 350 in the first communication line 10 and by the wireless communication unit 360 in the second communication line 20, and timings at which the received ultrasonic image data is displayed on the display 330.

In FIG. 3, at timing t1, the wireless communication unit 350 and the wireless communication unit 360 receive "image 1" as ultrasonic image data having an image number "1" assigned. Next, the wireless communication unit 350 and the wireless communication unit 360 complete the reception of the ultrasonic image data "image 1" at timing t2, and start receiving "image 2" as ultrasonic image data having an image number "2" assigned.

Here, the ultrasonic image data "image 1" is received by both of the wireless communication unit 350 and the wireless communication unit 360. In this case, the terminal device 300 of the present embodiment causes the image selection unit 331 to select the ultrasonic image data transmitted and received through the first communication line 10, to display the selected image on the display 330.

Therefore, the terminal device 300 causes the image selection unit 331 to select the ultrasonic image data "image 1" received by the wireless communication unit 350 at timing t2 at which reception of the ultrasonic image data "image 1" is completed, and displays the selected image on the display 330.

The wireless communication unit 350 and the wireless communication unit 360 start receiving ultrasonic image data of "image 2" at timing t2. Next, the wireless communication unit 350 and the wireless communication unit 360 complete the reception of the ultrasonic image data "image 2" at timing t3, and start receiving "image 3" as ultrasonic image data having an image number "3" assigned.

The ultrasonic image data "image 2" is also received by both of the wireless communication unit 350 and the wireless communication unit 360. Therefore, the image selection unit 331 selects the ultrasonic image data "image 2" transmitted and received through the first communication line 10, to display the selected image on the display 330.

Next, the wireless communication unit 360 of the second communication line 20 completes the reception of the ultrasonic image data "image 3" at timing t4, and starts receiving "image 4" as ultrasonic image data having an image number "4" assigned.

Meanwhile, at timing t4, the wireless communication unit 350 of the first communication line 10 has not yet completed reception of ultrasonic image data "image 3", and has not yet started reception of ultrasonic image data "image 4".

Therefore, the terminal device 300 causes the image selection unit 331 to select the ultrasonic image data "image 3" transmitted and received through the second communication line 20 at timing t4, and displays the selected image on the display 330.

Also, the wireless communication unit 360 of the second communication line 20 completes the reception of ultrasonic image data "image 4" at timing t5, and starts receiving ultrasonic image data "image 5" having an image number "5" assigned.

Also, the wireless communication unit 350 of the first communication line 10 starts receiving the ultrasonic image data "image 5" at timing t5, without having received the ultrasonic image data "image 4".

Therefore, the terminal device 300 causes the image selection unit 331 to select the ultrasonic image data "image 4" received by the second communication line 20 at timing t5, and displays the selected image on the display 330.

Next, both of the wireless communication unit 350 and the wireless communication unit 360 complete reception of the ultrasonic image data "image 5" at timing t6.

Therefore, at timing t6, the terminal device 300 causes the image selection unit 331 to select the ultrasonic image data "image 5" transmitted and received through the first communication line 10, and displays the selected image on the display 330.

In this way, in the case where the wireless communication unit 350 and the wireless communication unit 360 complete reception of the same ultrasonic image data at the same timing, the image selection unit 331 of the present embodiment selects the ultrasonic image data received by the wireless communication unit 350. Also, in the case where the wireless communication unit 350 and the wireless communication unit 360 do not receive ultrasonic image data at the same timing, the image selection unit 331 selects ultrasonic image data received by a wireless communication unit that completed the reception earlier.

In this way, the terminal device 300 of the present embodiment receives ultrasonic image data transmitted from the ultrasonic probe 200 through multiple communication lines; therefore, for example, in the case where the communication is interrupted in one of the communication lines, the ultrasonic image data can be received through the other communication line.

Figure 4:
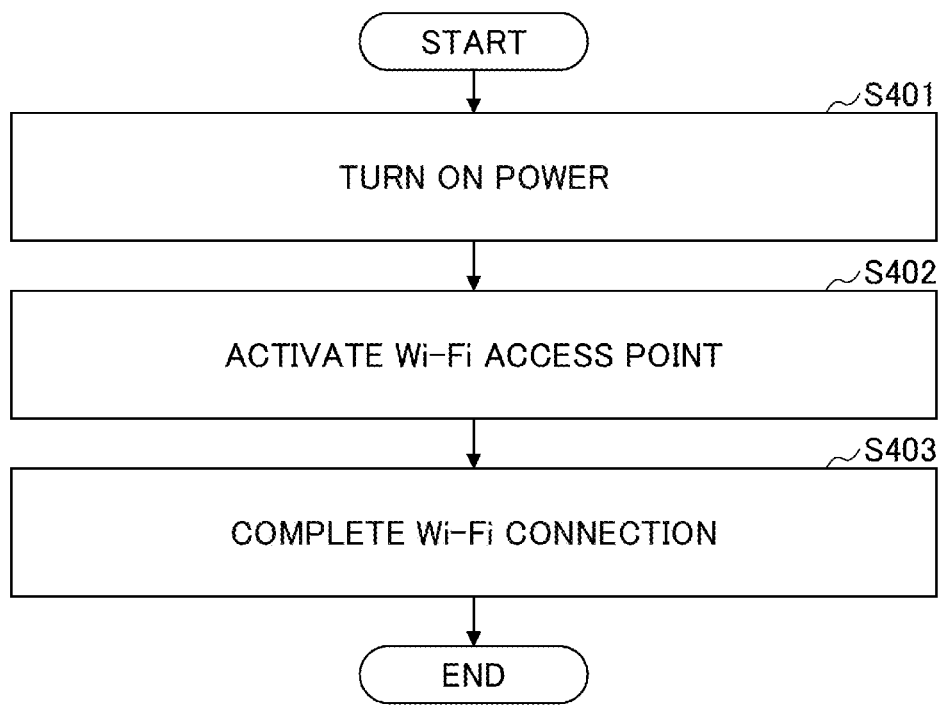
FIG. 4 is a first flowchart illustrating operations of an ultrasonic probe.

Next, operations of the devices included in the ultrasonic diagnostic system 100 of the present embodiment will be described. FIG. 4 is a first flowchart illustrating operations of the ultrasonic probe 200. In FIG. 4, operations up until the ultrasonic probe 200 is connected to Wi-Fi are illustrated.

In the ultrasonic probe 200, once the power is turned on (Step S401), the wireless communication unit 280 and the wireless communication unit 290 detect and activate access points to be connected (Step S402), and complete the connection to Wi-Fi (Step S403).

Figure 5:
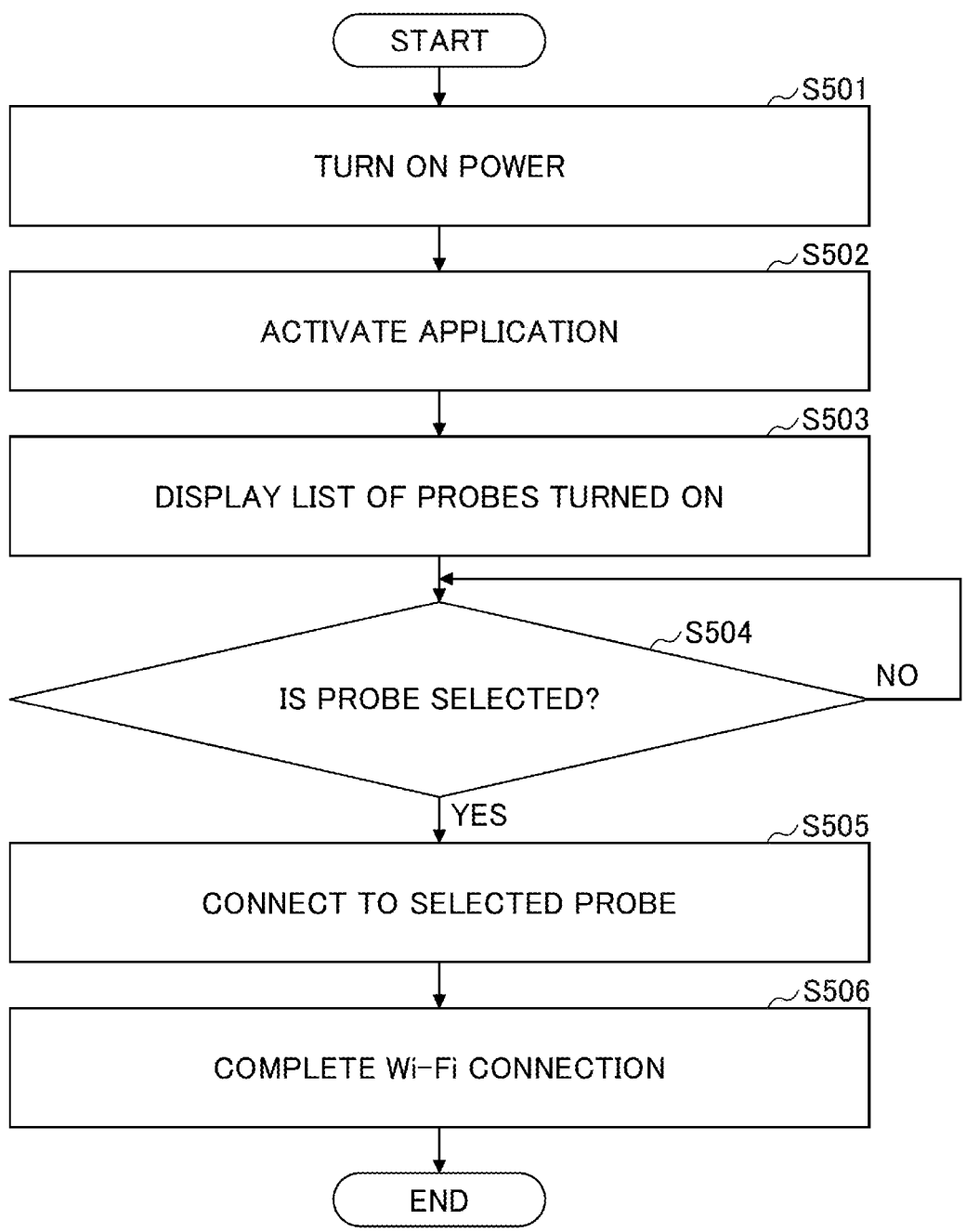
FIG. 5 is a first flowchart illustrating operations of a terminal device.

FIG. 5 is a first flowchart illustrating operations of the terminal device 300. In FIG. 5, operations up until the terminal device 300 is connected to the ultrasonic probe 200 through Wi-Fi are illustrated.

Once the power is turned on (Step S501) and the application is activated (Step S502), the terminal device 300 causes the wireless communication unit 350 and the wireless communication unit 360 to detect ultrasonic probes 200 in a state of the power being turned on, and display a list of the detected ultrasonic probes 200 on the display 330 (Step S503).

Specifically, in the case of recognizing one of or both of the service set identifiers (SSIDs) of the ultrasonic probes 200 corresponding to the wireless communication unit 280 and the wireless communication unit 290, the terminal device 300 detects the ultrasonic probes 200 as the ultrasonic probes 200 in a state of the power being turned on.

Next, the terminal device 300 determines whether or not an ultrasonic probe 200 is selected in the displayed list (Step S504). At Step S504, if an ultrasonic probe 200 is not selected, the terminal device 300 waits until an ultrasonic probe 200 is selected.

At Step S504, if an ultrasonic probe 200 is selected, the wireless communication unit 350 and the wireless communication unit 360 of the terminal device 300 connect to the selected ultrasonic probe 200 through Wi-Fi (Step S505), and complete the connection to the ultrasonic probe 200 (Step S506).

At this time, in the case where the wireless communication unit 280 and the wireless communication unit 290 of the selected ultrasonic probe 200 are connected to Wi-Fi, the terminal device 300 connects the wireless communication unit 350 to the wireless communication unit 280, and connects the wireless communication unit 360 to the wireless communication unit 290.

In other words, in the present embodiment, in the selected ultrasonic probe 200, in the case where multiple wireless communication units are connected to Wi-Fi, the selected ultrasonic probe 200 and the terminal device 300 are automatically connected through multiple communication lines.

In the following, with reference to FIG. 6, a display example of the terminal device 300 will be described. FIG. 6 is a diagram illustrating an example of a display of the terminal device 300 of the first embodiment. In FIG. 6, an example of a screen displayed on the display 330 of the terminal device 300 at Step S503 in FIG. 5 is illustrated.

In a display field 62 of a screen 61, a probe list 63 as a list of ultrasonic probes 200 in a state of the power being turned on, and an operation button 64 are displayed.

In the present embodiment, for example, if a probe 1 is selected in the probe list 63 and the operation button 64 is operated, the terminal device 300 connects to the ultrasonic probe 200 recognized as the probe 1.

Here, in the case where each of the wireless communication units of the ultrasonic probe 200 recognized as the probe 1 is connected to Wi-Fi, the terminal device 300 connects each of the wireless communication units of the terminal device 300 to Wi-Fi.

Note that the probe list 63 may also display a list of probe IDs for identifying ultrasonic probes 200. The probe ID may be stored, for example, in a storage device included in the control unit 220 of the ultrasonic probe 200. Also, the probe ID may include part of the SSID that identifies an access point of Wi-Fi.

In this way, according to the terminal device 300 of the present embodiment, by executing a connection operation for one ultrasonic probe 200, two lines of Wi-Fi connection to the one ultrasonic probe 200 are automatically established. Therefore, according to the present embodiment, the two lines of Wi-Fi of the terminal device 300 are not connected to different ultrasonic probes 200, and erroneous connections can be prevented.

Also, according to the present embodiment, without causing the user of the ultrasonic probe 200 to be conscious of using multiple communication lines, the user can connect the ultrasonic probe 200 and the terminal device 300 through the multiple communication lines, by a simple operation.

Next, with reference to FIG. 7, operations executed by the ultrasonic probe 200 of the present embodiment to transmit ultrasonic image data will be described. FIG. 7 is a second flowchart illustrating operations of the ultrasonic probe 200.

The ultrasonic probe 200 of the present embodiment is connected to the terminal device 300 in wireless communication through the first communication line 10 (Step S701), and then, connected to the terminal device 300 in wireless communication through the second communication line 20 (Step S702).

Specifically, the ultrasonic probe 200 causes the wireless communication unit 280 to connect to the wireless communication unit 350, and causes the wireless communication unit 290 to connect to the wireless communication unit 360.

Next, the ultrasonic probe 200 starts generating ultrasonic image data by processing executed by the digital signal processing unit 250 and the like (Step S703).

Next, once having started generation of the ultrasonic image data, the ultrasonic probe 200 causes the image number assigning unit 260 to set "1" as the initial value of a variable X representing the image number (Step S704).

Next, the ultrasonic probe 200 determines whether the ultrasonic image data representing one ultrasonic image is completed (Step S705). At Step S705, if the ultrasonic image data is not completed, the ultrasonic probe 200 waits until the ultrasonic image data is completed.

At Step S705, if the ultrasonic image data is completed, the ultrasonic probe 200 causes the image number assigning unit 260 to assign the image number X to the ultrasonic image data. Then, the ultrasonic probe 200 causes each of the wireless communication unit 280 and the wireless communication unit 290 to transmit the ultrasonic image data having the image number assigned to the terminal device 300 (Step S706).

Next, the ultrasonic probe 200 causes the image number assigning unit 260 to count up the value of the image number X by setting X=X+1 (Step S707).

Next, the ultrasonic probe 200 determines whether or not the power is turned off (Step S708). At Step S708, if the power is not turned off, the ultrasonic probe 200 returns to Step S705. At Step S708, if the power is turned off, the ultrasonic probe 200 ends the process.

Figure 8A:
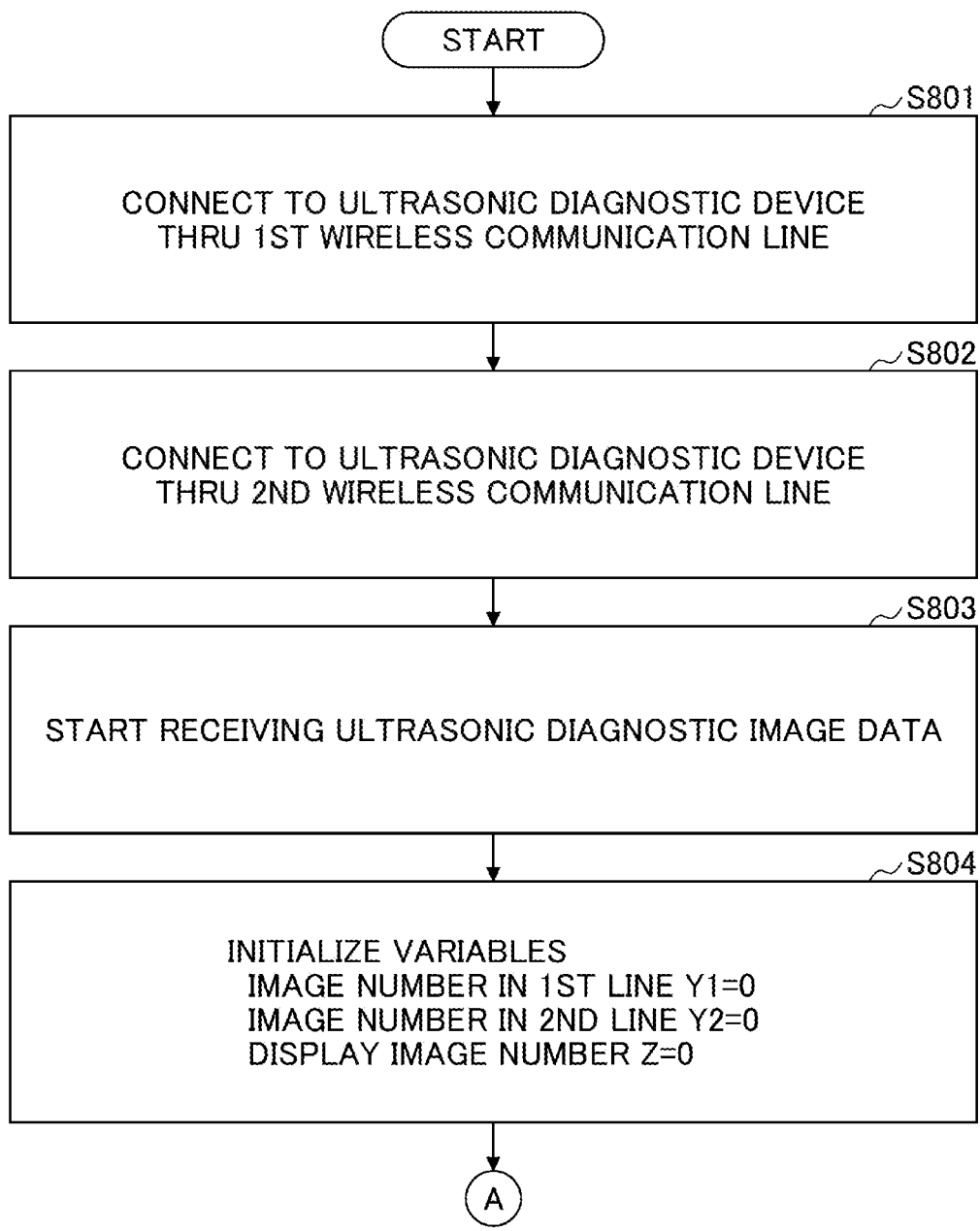
FIG. 8A is a second flowchart illustrating operations of the terminal device.

Next, with reference to FIGS. 8A and 8B, operations executed by the terminal device 300 of the present embodiment to receive ultrasonic image data will be described. FIG. 8A is a second flowchart illustrating operations of the terminal device 300.

The terminal device 300 of the present embodiment connects to the ultrasonic probe 200 for communication through the first communication line 10 (Step S801), and then, connects to the ultrasonic probe 200 for communication through the second communication line 20 (Step S802).

Specifically, the terminal device 300 causes the wireless communication unit 350 to connect to the wireless communication unit 280, and causes the wireless communication unit 360 to connect to the wireless communication unit 290.

Next, the terminal device 300 starts receiving ultrasonic image data by the wireless communication unit 350 and the wireless communication unit 360 (Step S803).

Next, the terminal device 300 causes the image selection unit 331 to set 0 to variable Y1, Y2, and Z to be referenced when selecting ultrasonic image data (Step S804), and proceeds to Step S805 illustrated in FIG. 8B.

Specifically, in the present embodiment, the image number assigned to ultrasonic image data that is received in communication through the first communication line 10 is represented by Y1, and the image number assigned to ultrasonic image data that is received in communication through the second communication line 20 is represented by Y2. In other words, in the present embodiment, the image number assigned to ultrasonic image data received by the wireless communication unit 350 is represented by Y1, and the image number assigned to ultrasonic image data received by the wireless communication unit 360 is represented by Y2. Also, in the present embodiment, the image number assigned to the ultrasonic image data selected by the image selection unit 331 is represented by Z. In other words, a display image number assigned to ultrasonic image data displayed on the display 330 is represented by Z. Further, the image selection unit 331 sets here these variables as Y1=0, Y2=0, and Z=0.

Next, the terminal device 300 executes processing from Step S805 to Step S807 in parallel with processing from Step S808 to Step S810.

Specifically, the terminal device 300 causes the wireless communication unit 350 included in the first communication line 10, to receive the ultrasonic image data and the image number (Step S805). Next, the terminal device 300 causes the image selection unit 331 to determine whether or not the reception of the ultrasonic image data by the wireless communication unit 350 is completed (Step S806).

At Step S806, if the reception is not completed, the terminal device 300 returns to Step S805. At Step S806, if the reception is completed, the terminal device 300 causes the image selection unit 331 to set the image number received with the ultrasonic image data as the value of the variable Y1 (Step S807), and proceeds to Step S811 that will be described later. Also, the terminal device 300 causes the wireless communication unit 360 included in the second communication line 20, to receive the ultrasonic image data and the image number (Step S808). Next, the terminal device 300 causes the image selection unit 331 to determine whether or not the reception of the ultrasonic image data by the wireless communication unit 360 is completed (Step S809).

At Step S809, if the reception is not completed, the terminal device 300 returns to Step S808. At Step S809, if the reception is completed, the terminal device 300 causes the image selection unit 331 to set the image number received with the ultrasonic image data as the value of the variable Y2 (Step S810), and proceeds to Step S811 that will be described later. The terminal device 300 causes the image selection unit 331 to determine whether or not the variable Y1 and the variable Y2 satisfy a relationship of Y1≥Y2 (Step S811).

In other words, here, the image selection unit 331 determines whether or not the wireless communication unit 350 has already received ultrasonic image data that is the same as the ultrasonic image data received by the wireless communication unit 360. In other words, the image selection unit 331 determines whether or not both of the wireless communication unit 350 and the wireless communication unit 360 have completed reception of the same ultrasonic image data.

To further put it in other words, here, the image selection unit 331 selects, from among the multiple communication lines, a communication line that includes the received ultrasonic image data to be adopted.

At Step S811, if Y1≥Y2 is satisfied, the terminal device 300 causes the image selection unit 331 to determine whether or not the variable Y1 and the variable Z satisfy a relationship of Y1>Z (Step S812).

In other words, here, the terminal device 300 determines whether or not the ultrasonic image data of the image number Y1 corresponds to displayed ultrasonic image data already displayed on the display 330.

At Step S812, if Y1>Z is not satisfied, namely, if the value of the variable Y1 is less than or equal to the variable Z, the image selection unit 331 returns to Step S805. Note that not satisfying Y1>Z means that the ultrasonic image data of the image number Y1 is not the latest ultrasonic image data but ultrasonic image data that has been already displayed.

At Step S812, if Y1>Z is satisfied, the image selection unit 331 selects the ultrasonic image data of the image number Y1 as the ultrasonic image data to be displayed on the display 330 (Step S813).

Next, the image selection unit 331 sets the image number Y1 assigned to the ultrasonic image data to be displayed on the display 330 to the value of the variable Z as the display image number (Step S814), and proceeds to Step S818 that will be described later.

At Step S811, if Y1≥Y2 is not satisfied, the terminal device 300 causes the image selection unit 331 to determine whether or not the variable Y2 and the variable Z satisfy a relationship of Y2>Z (Step S815).

In other words, here, it is determined whether or not the ultrasonic image data of the image number Y2 corresponds to displayed ultrasonic image data already displayed on the display 330.

At Step S815, if Y2>Z is not satisfied, namely, if the value of the variable Y2 is less than or equal to the variable Z, the image selection unit 331 returns to Step S808. Note that not satisfying Y2>Z means that the ultrasonic image data of the image number Y2 is not the latest ultrasonic image data but ultrasonic image data that has been already displayed.

At Step S815, if Y2>Z is satisfied, the image selection unit 331 selects the ultrasonic image data of the image number Y2 as the ultrasonic image data to be displayed on the display 330 (Step S816).

Next, the image selection unit 331 sets the image number Y2 assigned to the ultrasonic image data to be displayed on the display 330 to the value of the variable Z as the display image number (Step S817), and proceeds to Step S818 that will be described later.

Next, the terminal device 300 displays the ultrasonic image data selected by the image selection unit 331 on the display 330 (Step S818).

Next, the terminal device 300 determines whether or not the reception of the ultrasonic image data ends (Step S819).

Specifically, if the ultrasonic image data has not been received for a certain period of time, the terminal device 300 may determine that reception of the ultrasonic image data ends. Also, the terminal device 300 may detect that the power of the ultrasonic probe 200 is turned off, to determine that reception of the ultrasonic image data ends. Also, when the power of the terminal device 300 is turned off, the terminal device 300 may determine that reception of the ultrasonic image data ends.

At Step S819, if it is determined that reception of the ultrasonic image data does not end, the terminal device 300 returns to Step S805 and the Step S808.

At Step S819, if it is determined that reception of the ultrasonic image data ends, the terminal device 300 ends the process.

Next, with reference to FIG. 9, packets used for transmission and reception of ultrasonic image data will be described. FIG. 9 illustrates an example of packets used when transmitting ultrasonic image data.

The ultrasonic probe 200 of the present embodiment transmits a single frame of ultrasonic image data as multiple packets. At this time, the ultrasonic probe 200 includes the image number assigned by the image number assigning unit 260 in the packet header. In this way, the ultrasonic probe 200 can transmit the ultrasonic image data having the image number assigned, to the terminal device 300.

As described above, in the terminal device 300 of the present embodiment, in the case where both of the first communication line 10 and the second communication line 20 receive the same ultrasonic image data, the ultrasonic image data received in the first communication line 10 is displayed on the display 330.

Also, in the terminal device 300 of the present embodiment, among the first communication line 10 and the second communication line 20, in a communication line selected as the communication line that includes the received ultrasonic image data adopted for displaying, among the received ultrasonic image data items, the latest ultrasonic image data item is displayed on the display 330.

In this way, according to the present embodiment, transmission and reception of ultrasonic image data are executed using multiple communication lines; therefore, even if communication through one of the communication lines is interrupted, as long as communication through the other communication line is not interrupted, the transmission and reception of the ultrasonic image data can be executed through the uninterrupted line. Therefore, according to the present embodiment, interruptions during communication can be reduced, and wireless communication between an ultrasonic probe and a terminal device can be executed satisfactorily.

Second Embodiment

In the following, a second embodiment will be described with reference to the drawings. In the second embodiment, a communication line that executes transmission and reception of ultrasonic image data also serves as the control communication line, and in this regard, it is different from the first embodiment. Therefore, in the following description of the second embodiment, the differences from the first embodiment will be described, and those elements having the same functional configurations as in the first embodiment are assigned the same reference numerals as used in the description of the first embodiment, and the description will be omitted.

Figure 10:
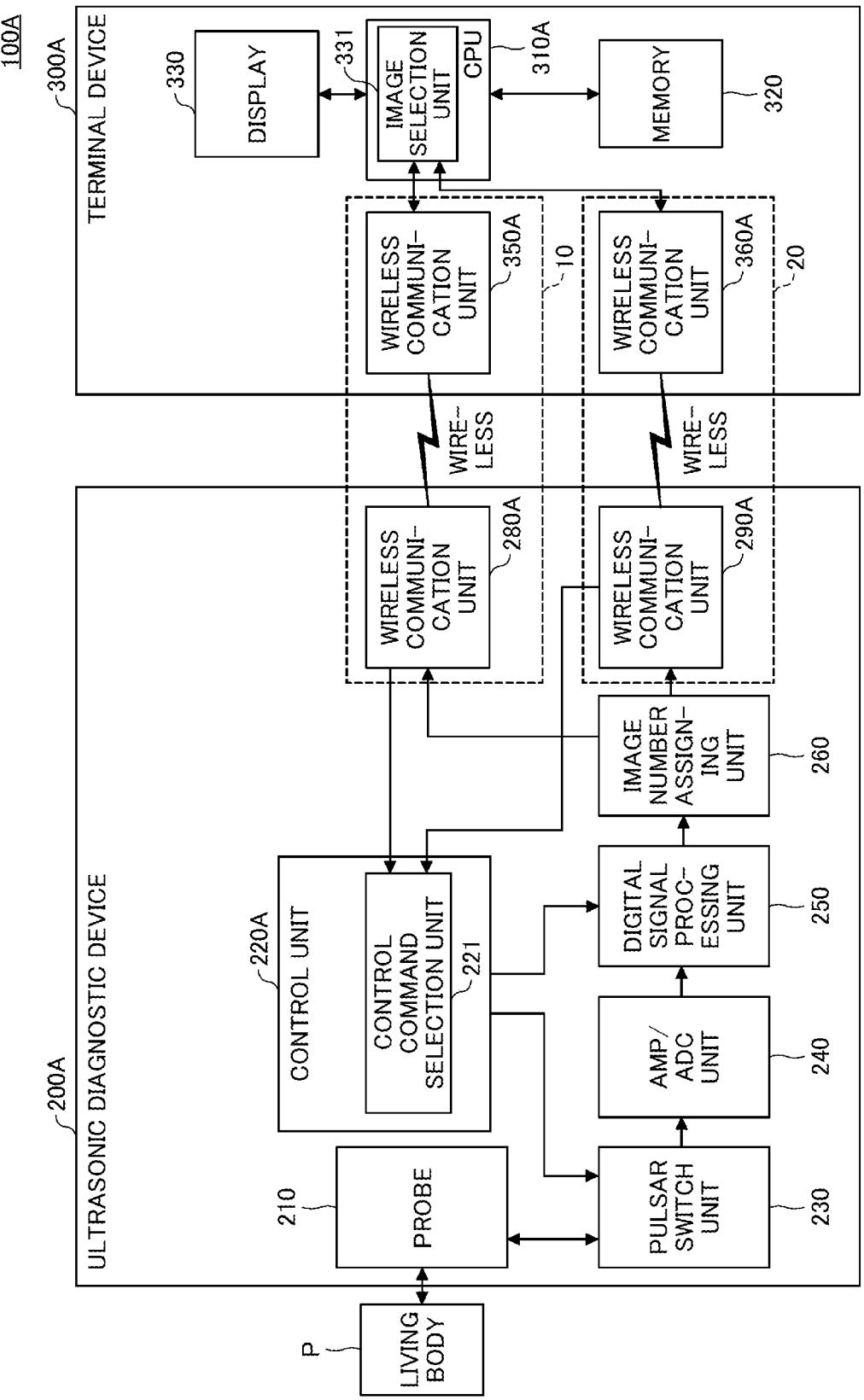
FIG. 10 is a diagram illustrating an example of a system configuration of an ultrasonic diagnostic system of a second embodiment.

FIG. 10 is a diagram illustrating a system configuration of an ultrasonic diagnostic system of the second embodiment.

In the present embodiment, an ultrasonic diagnostic system 100A includes an ultrasonic probe 200A and a terminal device 300A.

The ultrasonic probe 200A includes a probe 210, a control unit 220A, a pulsar switch unit 230, an AMP/ADC unit 240, a digital signal processing unit 250, an image number assigning unit 260, a wireless communication unit 280A, and a wireless communication unit 290A.

The terminal device 300A includes a CPU 310A, a memory 320, a display 330, a wireless communication unit 350A, and a wireless communication unit 360A.

In the ultrasonic diagnostic system 100A of the present embodiment, the wireless communication unit 280A and the wireless communication unit 350A are included in the first communication line 10, and the wireless communication unit 290A and the wireless communication unit 360A are included in the second communication line 20.

In the present embodiment, a control signal transmitted from the terminal device 300A to the ultrasonic probe 200A is also transmitted and received using the first communication line 10 and the second communication line 20. In other words, the first communication line 10 and the second communication line 20 also serve as the control communication line.

Specifically, the CPU 310A of the terminal device 300A causes the wireless communication unit 350A and the wireless communication unit 360A to transmit a control signal to the ultrasonic probe 200A. In other words, the terminal device 300A transmits the control signal to the ultrasonic probe 200A using the multiple communication lines.

In the ultrasonic probe 200A of the present embodiment, the wireless communication unit 280A receives the control signal transmitted from the wireless communication unit 350A, and outputs the received control signal to the control unit 220A. The wireless communication unit 290A receives the control signal transmitted from the wireless communication unit 360A, and outputs the received control signal to the control unit 220A.

In other words, the ultrasonic probe 200A of the present embodiment receives the control signal from the terminal device 300A using the multiple communication lines.

The control unit 220A of the present embodiment includes a control command selection unit 221. Similar to the image selection unit 331, the control command selection unit 221 selects a control signal used to control the ultrasonic probe 200A, from among the respective control signals received by the wireless communication unit 280A and the wireless communication unit 290A.

Specifically, for example, the CPU 310A of the terminal device 300A assigns a signal number to the control signal, and causes the wireless communication unit 350A and the wireless communication unit 360A to transmit the same control signal having the signal number assigned, to the ultrasonic probe 200A.

In the case where the control number assigned to the control signal received by the wireless communication unit 280A is the same as the control number assigned to the control signal received by the wireless communication unit 290A, the control command selection unit 221 of the ultrasonic probe 200A may select the control signal received by the wireless communication unit 280A, and pass the selected control signal to the control unit 220A.

Also, in the case where the wireless communication unit 280A has not received a control signal whose signal number is the same as the signal number assigned to the control signal received by the wireless communication unit 290A, the control command selection unit 221 may select the control signal received by the wireless communication unit 290A, and pass the selected control signal to the control unit 220A.

In this way, in the present embodiment, by using the first communication line 10 and the second communication line 20, ultrasonic image data and control signals can be transmitted and received. Therefore, according to the present embodiment, the wireless communication units to execute transmission and reception of control signals can be reduced in the ultrasonic probe and in the terminal device.

Third Embodiment

In the following, a third embodiment will be described with reference to the drawings. In the third embodiment, the communication line to be used is switched in the ultrasonic probe, and in this regard, it is different from the first embodiment. Therefore, in the following description of the third embodiment, the differences from the first embodiment will be described, and those elements having the same functional configurations as in the first embodiment are assigned the same reference numerals as used in the description of the first embodiment, and the description will be omitted.

Figure 11:
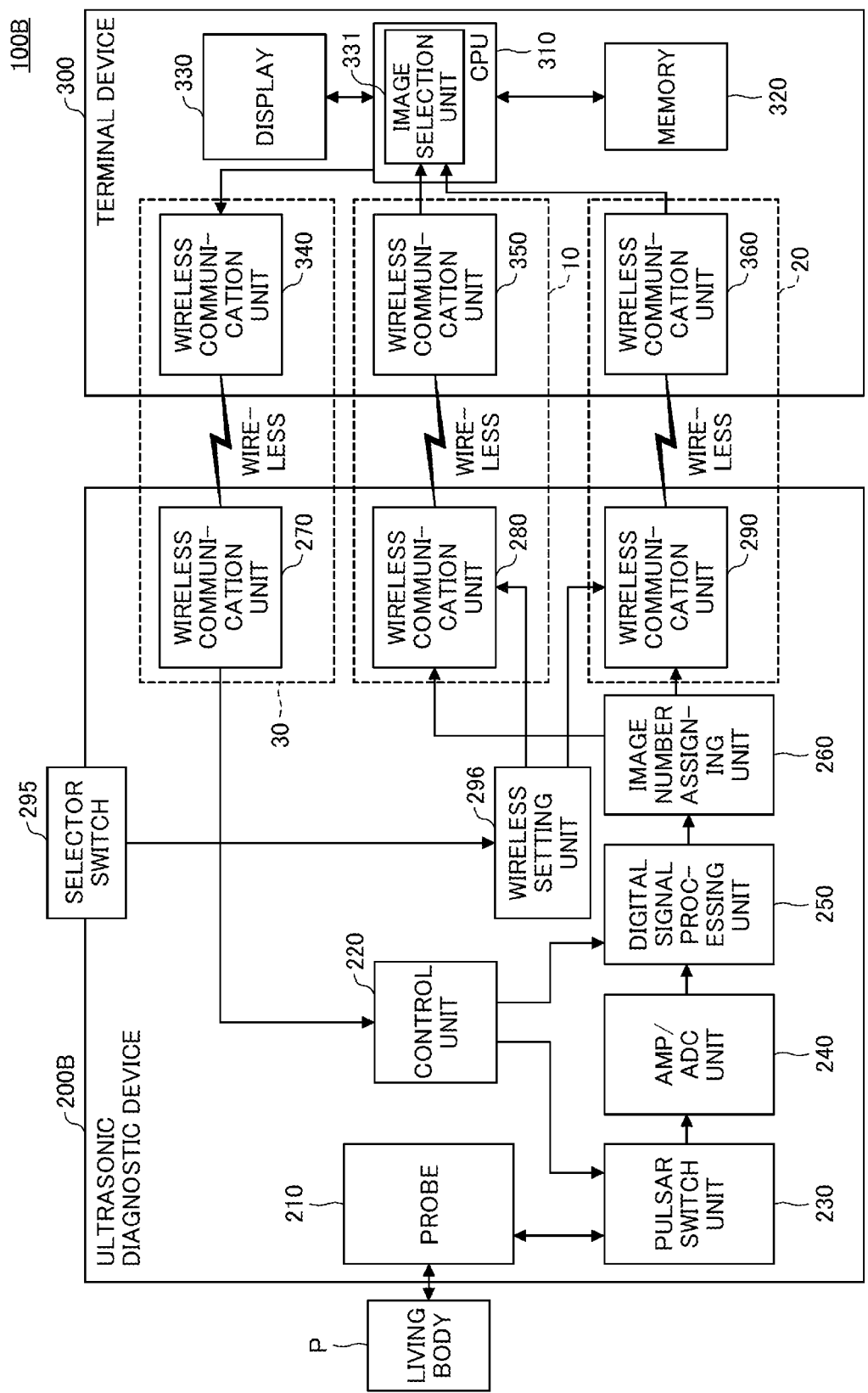
FIG. 11 is a diagram illustrating an example of a system configuration of an ultrasonic diagnostic system of a third embodiment.

FIG. 11 is a diagram illustrating a system configuration of an ultrasonic diagnostic system of the third embodiment.

In the present embodiment, an ultrasonic diagnostic system 100B includes an ultrasonic probe 200B and a terminal device 300.

An ultrasonic probe 200B of the present embodiment includes a probe 210, a control unit 220, a pulsar switch unit 230, an AMP/ADC unit 240, a digital signal processing unit 250, an image number assigning unit 260, a wireless communication unit 270, a wireless communication unit 280, a wireless communication unit 290, a selector switch 295, and a wireless setting unit 296.

In the ultrasonic probe 200B of the present embodiment, the communication line used for transmission and reception of ultrasonic image data is switched from among and single-line configurations and a two-line configuration by the selector switch 295. In other words, the ultrasonic probe 200B selects, by the selector switch 295, wireless communication units to be used for wireless communication, from among the wireless communication unit 280, the wireless communication unit 290, and both of the wireless communication unit 280 and the wireless communication unit 290. In other words, the selector switch 295 is a switch for selecting the wireless communication units to be used for transmission and reception of the ultrasonic image data.

The selector switch 295 of the present embodiment is, for example, a switch provided in a housing or the like of the ultrasonic probe 200B, and may be operated by the user of the ultrasonic probe 200B.

The wireless setting unit 296 of the present embodiment operates to supply electric power to the wireless communication unit selected by the selector switch 295.

Specifically, for example, in the case where the wireless communication unit 280 is selected by the selector switch 295 as the wireless communication unit for wireless communication, the wireless setting unit 296 may cut off electric power supplied to the wireless communication unit 290. Alternatively, the wireless setting unit 296 may cause the wireless communication unit 290 to transition into a low-power consumption mode.

In this way, in the ultrasonic probe 200B of the present embodiment, the number of wireless communication units used for wireless communication can be switched between one and more than one. Therefore, according to the present embodiment, it is useful when the user wants to reduce the power consumption of the ultrasonic probe 200B.

Also, in the present embodiment, the terminal device 300 may display information on the display 330, to indicate whether communication with the ultrasonic probe 200B is being executed through multiple communication lines or executed through a single line.

Figure 12:
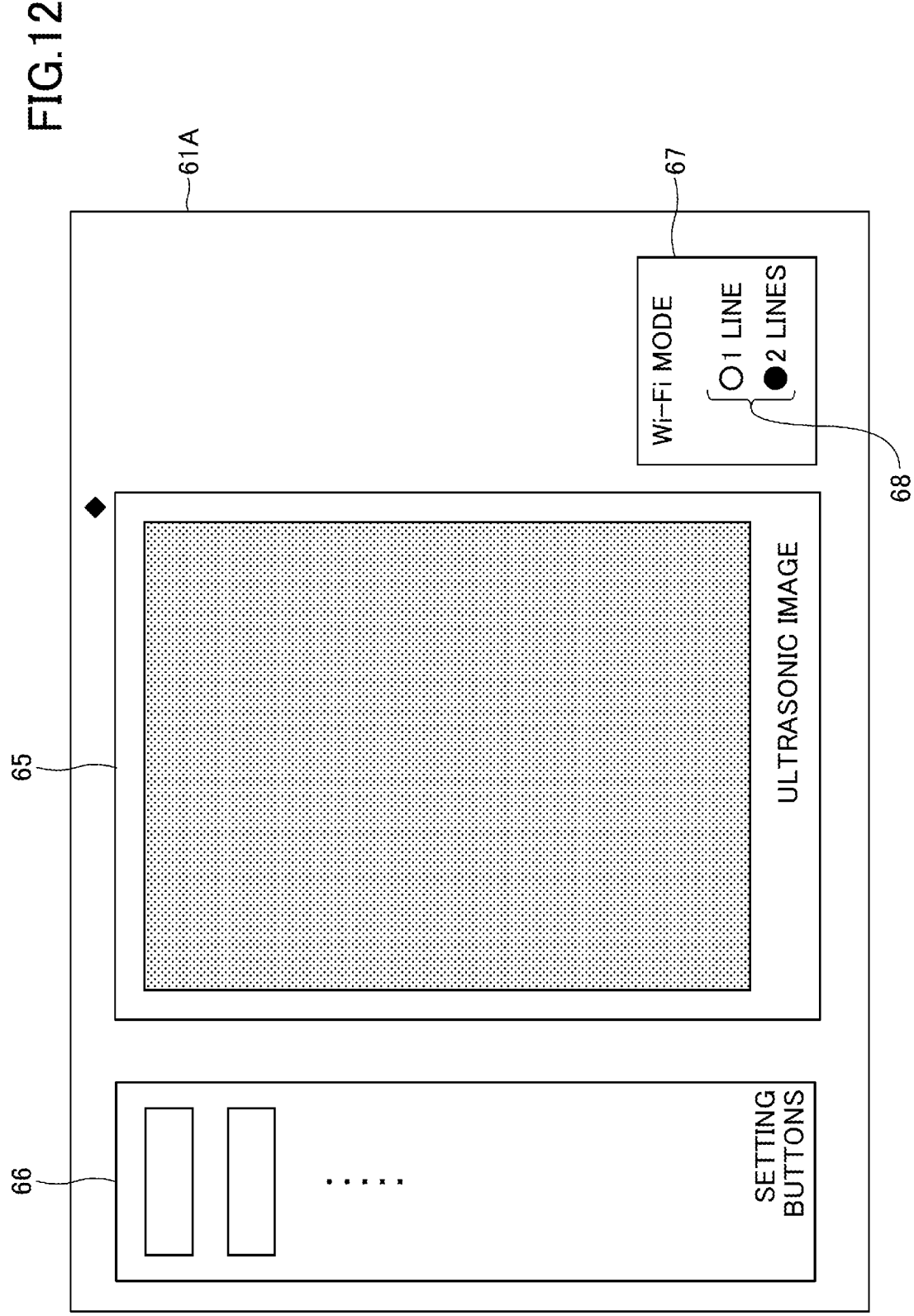
FIG. 12 is a diagram illustrating an example of a display of a terminal device of the third embodiment.

FIG. 12 is a diagram illustrating an example of a display of the terminal device 300 of the third embodiment. A screen 61A illustrated in FIG. 12 is an example of a screen displayed on the display 330 while the terminal device 300 is executing wireless communication with the ultrasonic probe 200B.

The screen 61A includes display fields 65, 66, and 67. The display field 65 displays an ultrasonic image represented by ultrasonic image data from the ultrasonic probe 200B. The display field 66 includes various setting buttons.

The display field 67 displays information 68 that indicates the number of communication lines established with the ultrasonic probe 200B. The information 68 includes information representing, for example, a list of numbers of communication lines that can be selected by operating the selector switch 295, and the number of communication lines currently selected.

In the display field 67, the numbers of communication lines that can be selected are one line and two lines, and it can be seen that the two-line item is currently selected.

Note that in the ultrasonic diagnostic system 100B of the present embodiment, although it is assumed that communication between the ultrasonic probe 200B and the terminal device 300 is executed through the first communication line 10 and the second communication line 20, it is not limited as such.

For example, in the case where an ultrasonic probe has three wireless communication units to execute transmission and reception of ultrasonic image data, the information 68 displayed in the display field 67 displays the "1 line, 2 lines, and 3 lines" as the list of selectable numbers of communication lines.

In the present embodiment, in this way, the selectable numbers of communication lines and the currently selected number of communication lines can be presented to the user of the ultrasonic diagnostic system 100B.

Figure 13:
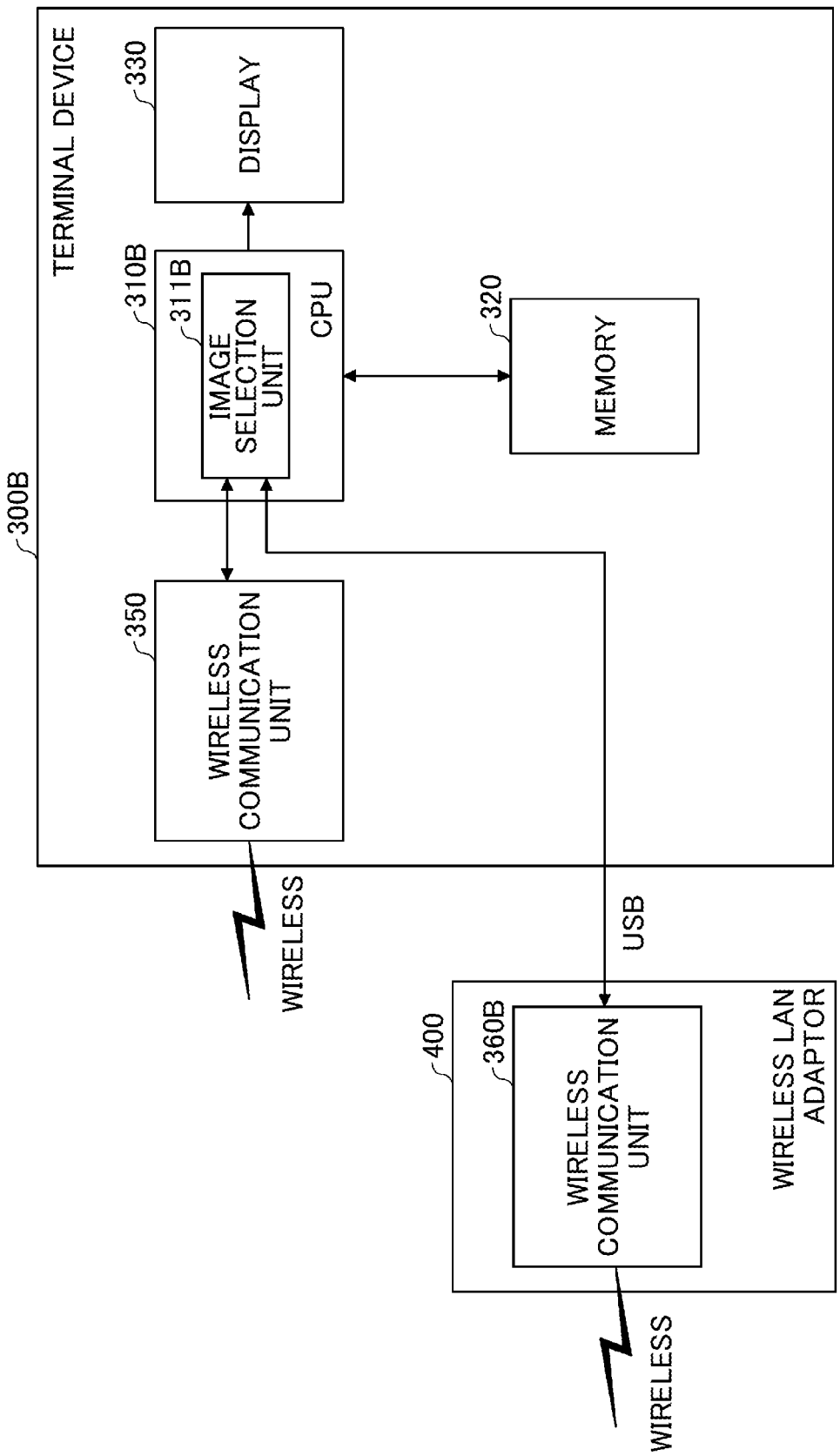
FIG. 13 is a diagram illustrating a modified example of a terminal device.

Next, with reference to FIG. 13, a modified example of the terminal device 300 will be described. FIG. 13 is a diagram illustrating a modified example of the terminal device 300.

The terminal device 300B illustrated in FIG. 13 includes a wireless communication unit 350, a CPU 310B, a memory 320, and a display 330, and the CPU 310B includes an image selection unit 311B.

Also, the terminal device 300B is connected to a wireless LAN adaptor 400 through a USB (Universal Serial Bus) connection. More specifically, the CPU 310B of the terminal device 300B is connected to the wireless communication unit 360B included in the wireless LAN adaptor 400 through the USB.

In the CPU 310B, the image selection unit 311B selects either one of ultrasonic image data received by the wireless communication unit 350 or ultrasonic image data received by the wireless communication unit 360B, and displays the selected image data on the display 330.

In this way, by using the wireless LAN adaptor 400, even a terminal device having only a single line can be applied to the embodiments described above.

As above, the present invention has been described based on the embodiments; note that the present invention is not limited by the requirements presented in the above embodiments. In these respects, it is possible to make alterations within a range where the gist of the present invention is not changed, which may be properly defined depending on the form of application.

What is claimed is:

1. An ultrasonic diagnostic system comprising:
    an ultrasonic probe; and
    a terminal device,
    wherein the ultrasonic probe includes:
        a probe configured to receive an ultrasonic wave;
        a plurality of first wireless communication devices; and
        processing circuitry configured to assign identification information to ultrasonic image data generated based on the ultrasonic wave, for identifying the ultrasonic image data,
    wherein, the processing circuity causes the plurality of first wireless communication devices to transmit to the terminal device simultaneously in parallel, identical sequences of images with respective image numbers assigned thereto, the identical sequence of images being the ultrasonic image data, and the image numbers being the identification information,
    wherein each of the images is transmitted from the ultrasonic probe as a series of packets, with a corresponding image number included only in a first packet and not in subsequent packets,
    wherein the terminal device includes:
        a display device;
        a plurality of second wireless communication devices each configured to be paired with a corresponding one of the plurality of first wireless communication devices of the ultrasonic probe;
        a memory; and
        a processor configured to
            cause each of the plurality of second wireless communication devices to receive part or all of the identical sequences of images with the respective image numbers, and transmitted from the corresponding one of the plurality of first wireless communication devices of the ultrasonic probe, and
            select ultrasonic image data to be displayed on the display device, from among the ultrasonic image data in the part or all of the identical sequences of images received by the plurality of second wireless communication devices, based on the identification information and a determination of whether or not at least two of the plurality of second wireless communication devices have completed reception of same image data, such that a latest image received by a predetermined one of the plurality of second wireless communication devices is displayed when latest images received by the plurality of second wireless communication devices have identical image numbers, and a latest image received by another one of the plurality of second wireless communication devices is displayed when the latest image received the another one has an image number later than an image number of the latest image received by the predetermined one of the plurality of second wireless communication devices.

2. A non-transitory computer-readable recording medium having computer-readable instructions stored thereon, which when executed, cause a computer including a memory, a processor, a display device, and a plurality of first wireless communication devices, to execute a process of ultrasonic diagnostic, the process comprising:
    receiving simultaneously in parallel, identical sequences of images with respective image numbers assigned thereto transmitted from a plurality of second wireless communication devices included in an ultrasonic probe, by the first wireless communication devices of the computer each paired with a corresponding one of the plurality of second wireless communication devices included in the ultrasonic probe, the identical sequence of images being the ultrasonic image data, and the image numbers being the identification information, wherein each of the images is transmitted from the ultrasonic probe as a series of packets, with a corresponding image number included only in a first packet and not in subsequent packets; and selecting the ultrasonic image data to be displayed on the display device from among the ultrasonic image data received by the paired first wireless communication devices, based on the identification information and a determination of whether or not at least two of the plurality of first wireless communication devices have completed reception of same image data, such that a latest image received by a predetermined one of the plurality of first wireless communication devices is displayed when latest images received by the plurality of first wireless communication devices have identical image numbers, and a latest image received by another one of the plurality of first wireless communication devices is displayed when the latest image received the another one has an image number later than an image number of the latest image received by the predetermined one of the plurality of first wireless communication devices.

3. The non-transitory computer-readable recording medium as claimed in claim 2, wherein the process further includes displaying a list of ultrasonic probes available for wireless communication, receiving a selection of an ultrasonic probe in the list, and connecting the plurality of second wireless communication devices included in the selected ultrasonic probe, to the first wireless communication devices to be paired.

4. The non-transitory computer-readable recording medium as claimed in claim 2, wherein the process further includes displaying on the display device, information including
a number of the paired first wireless communication devices, and
a first wireless communication device being used for receiving the ultrasonic image data, among the paired first wireless communication devices.

5. A method of ultrasonic diagnosis executed by an ultrasonic diagnostic system including an ultrasonic probe and a terminal device, wherein the ultrasonic probe includes
a probe configured to receive an ultrasonic wave;
a plurality of first wireless communication devices; and
processing circuitry, and wherein the terminal device includes
a display device;
a plurality of second wireless communication devices each configured to be paired with a corresponding one of the plurality of first wireless communication devices of the probe;
a memory; and
a processor, the method comprising:

assigning, executed by the ultrasonic probe, identification information to ultrasonic image data generated based on the ultrasonic wave, for identifying the ultrasonic image data;

causing, executed by the ultrasonic probe, the plurality of first wireless communication devices of the ultrasonic probe to transmit, to the terminal device simultaneously in parallel, identical sequences of images with respective image numbers assigned thereto, the identical sequences of images being the ultrasonic image data, and the image numbers being the identification information, wherein each of the images is transmitted from the ultrasonic probe as a series of packets, with a corresponding image number included only in a first packet and not in subsequent packets;

causing, executed by the terminal device, each of the second plurality of wireless communication devices to receive the sequences of images with the respective image numbers, and transmitted from the corresponding one of the plurality of first wireless communication devices of the ultrasonic probe, and selecting, executed by the terminal device, ultrasonic image data to be displayed on the display device from among the ultrasonic image data in the sequences of images received by the paired second wireless communication devices, based on the identification information and a determination of whether or not at least two of the plurality of second wireless communication devices have completed reception of same image data, such that a latest image received by a predetermined one of the plurality of second wireless communication devices is displayed when latest images received by the plurality of second wireless communication devices have identical image numbers, and a latest image received by another one of the plurality of second wireless communication devices is displayed when the latest image received the another one has an image number later than an image number of the latest image received by the predetermined one of the plurality of second wireless communication devices.

6. The ultrasonic diagnostic system as claimed in claim 1, wherein the display device displays a number of selected first wireless communication devices of the ultrasonic probe.

7. The ultrasonic diagnostic system as claimed in claim 1, wherein the display device displays information about selectable first wireless communication devices of the ultrasonic probe.

* * * * *